(12) United States Patent
Dhanabalan et al.

(10) Patent No.: US 11,553,304 B2
(45) Date of Patent: *Jan. 10, 2023

(54) GEO-BASED CONNECTIVITY AWARENESS FOR BETTER PRODUCTIVITY

(71) Applicant: CITRIX SYSTEMS, INC., Fort Lauderdale, FL (US)

(72) Inventors: Praveen Raja Dhanabalan, Karnataka (IN); Sandeep Manohar Nirikhi, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/098,566

(22) Filed: Nov. 16, 2020

(65) Prior Publication Data
US 2021/0067909 A1 Mar. 4, 2021

Related U.S. Application Data

(63) Continuation of application No. 15/838,769, filed on Dec. 12, 2017, now Pat. No. 10,841,738.

(51) Int. Cl.
*H04W 4/02* (2018.01)
*G01C 21/00* (2006.01)
*H04L 41/12* (2022.01)
*G01C 21/34* (2006.01)
*G06F 9/455* (2018.01)
*H04W 16/00* (2009.01)

(52) U.S. Cl.
CPC .......... *H04W 4/025* (2013.01); *G01C 21/005* (2013.01); *G01C 21/3461* (2013.01); *H04L 41/12* (2013.01); *G06F 9/45558* (2013.01); *H04W 16/00* (2013.01)

(58) Field of Classification Search
None
See application file for complete search history.

(56) References Cited

U.S. PATENT DOCUMENTS

| 9,086,291 | B1 | 7/2015 | Bhatia et al. |
| 2011/0310867 | A1 | 12/2011 | Kennedy et al. |
| 2012/0284322 | A1 | 11/2012 | Laborczfalvi et al. |

(Continued)

FOREIGN PATENT DOCUMENTS

WO WO2009156554 12/2009

*Primary Examiner* — Basil Ma
(74) *Attorney, Agent, or Firm* — Allen, Dyer, Doppelt + Gilchrist, PA

(57) ABSTRACT

A server includes a network interface to interface with mobile computing devices operating within a geographical area, with at least one of the mobile computing devices providing a request for navigation instructions between two geo-locations based on prompting the user to select an optimized connectivity route prompt. A processor is coupled to the network interface and is configured to generate a network connectivity map based on varying cellular network connectivity metrics for the geographical area, and generate, based on the user-selected optimized connectivity route prompt, the navigation instructions between the two geo-locations to be provided to the at least one mobile communications device via said network interface. The navigation instructions are generated based on the network connectivity map to provide a single route that is optimized to include areas with strong cellular network connectivity metric values.

19 Claims, 5 Drawing Sheets

(56) References Cited

U.S. PATENT DOCUMENTS

| | | |
|---|---|---|
| 2013/0124087 A1 | 5/2013 | Bauchot et al. |
| 2014/0067257 A1 | 3/2014 | Dave et al. |
| 2014/0379252 A1 | 12/2014 | Sorokin et al. |
| 2016/0091334 A1 | 3/2016 | Chakra et al. |
| 2017/0219368 A1 | 8/2017 | Meredith et al. |
| 2017/0314940 A1 | 11/2017 | Dave et al. |
| 2019/0041227 A1 | 2/2019 | Shetty et al. |

GEO-BASED CONNECTIVITY AWARENESS FOR BETTER PRODUCTIVITY

RELATED APPLICATIONS

This application is a continuation of U.S. application Ser. No. 15/838,769 filed Dec. 12, 2017, which is hereby incorporated herein in its entirety by reference.

TECHNICAL FIELD

The present disclosure relates to the field of mobile computing devices, and more particularly, to providing network connectivity based navigation instructions to an enterprise mobile users while on the move.

BACKGROUND

Enterprise productivity software is aimed at boosting user productivity by allowing workers to reliably and securely work using a computing device regardless of its location. Enterprise productivity software includes XenMobile, XenApp, and online collaboration tools, for example.

Variability in the quality and strength of Internet connectivity is a challenge when providing consistent and reliable connection experiences for remote and mobile users. Mobile users who are sales professionals, for example, frequently travel and typically need to participate in online meetings and conference calls while travelling on the road.

However, when a mobile computing device is in use while the user is traveling on the road, an online meeting or conference call may be vulnerable to signal fluctuations, connectivity issues and call disruptions. Consequently, there is a need to improve application performance and user experience for a mobile user while on the move.

SUMMARY

A server includes a network interface to interface with mobile computing devices operating within a geographical area, with at least one of the mobile computing devices providing a request for navigation instructions between two geo-locations based on prompting the user to select an optimized connectivity route prompt. A processor is coupled to the network interface and is configured to generate a network connectivity map based on varying cellular network connectivity metrics for the geographical area, and generate, based on the user-selected optimized connectivity route prompt, the navigation instructions between the two geo-locations to be provided to the at least one mobile communications device via said network interface. The navigation instructions are generated based on the network connectivity map to provide a single route that is optimized to include areas with strong cellular network connectivity metric values.

The route provided by the processor may not be the most direct route between the two geo-locations within the geographical area.

The cellular network connectivity metrics may be based on at least one cellular network connectivity map from at least one cellular network service provider operating within the geographical area.

The cellular network connectivity metrics may be based on signal strength measurements provided by the plurality of mobile computing devices operating within the geographical area.

The signal strength measurements provided by each respective mobile computing device may further include geo-coordinates on where the signal strength measurements were made. The signal strength measurements provided by each respective mobile computing device may include identification of a cellular network service provider operating with the respective mobile computing device.

Another aspect is directed to a method for operating a server as described above to generate network connectivity based navigation instructions for a mobile computing device. The method comprises interfacing with a plurality of mobile computing devices operating within a geographical area, with at least one of the mobile computing devices providing a request for navigation instructions between two geo-locations based on prompting the user to select an optimized connectivity route prompt. A network connectivity map may be generated based on varying cellular network connectivity metrics for the geographical area. Based on the user-selected optimized connectivity route prompt, the navigation instructions may be generated between the two geo-locations to be provided to the at least one mobile communications device via the network interface. The navigation instructions may be generated based on the network connectivity map to provide a single route that is optimized to include areas with strong cellular network connectivity metric values.

Yet another aspect is directed to a non-transitory computer readable medium for a server as described above, with the non-transitory computer readable medium having a plurality of computer executable instructions for causing the server to generate network connectivity based navigation instructions.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As a general introduction, a server is configured to provide network connectivity based navigation instructions between any two geolocations within a geographical area. Network connectivity based navigation instructions are intended to enable business continuity and uninterrupted application access for enterprise mobile users while on the move. The navigation routes optimize cellular network connectivity instead of the shortest distance or the shortest time. This means that the navigation route provided to an enterprise mobile user may be longer as compared to other available routes so that continuity disruptions are minimized.

Figure 1:
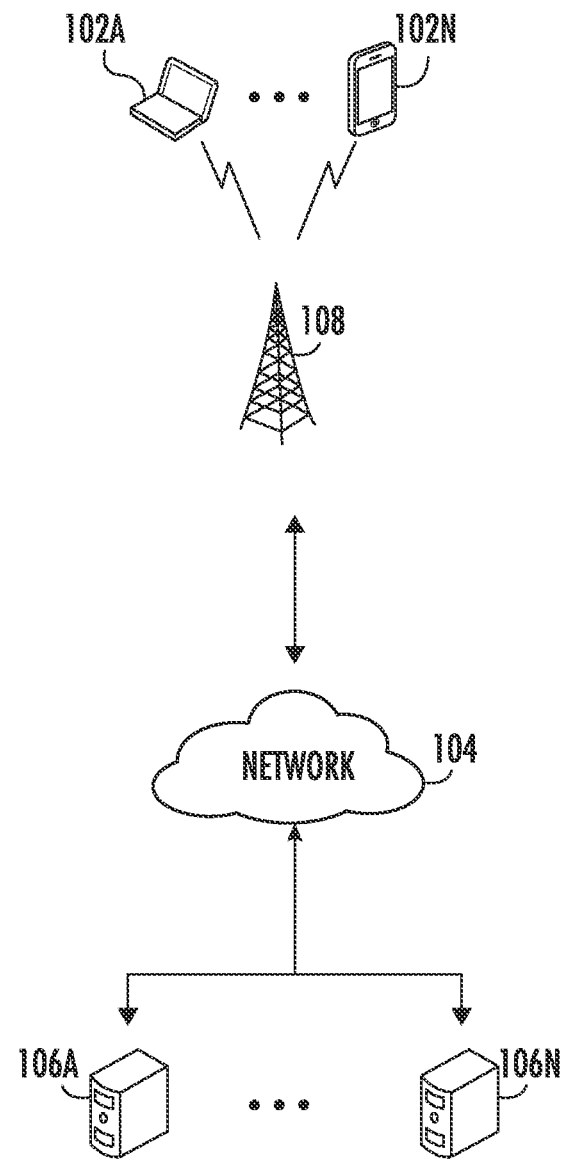
FIG. 1 illustrates an embodiment of a network environment that provides network connectivity based navigation instructions to mobile computing devices executing a map application.
Figure 2:
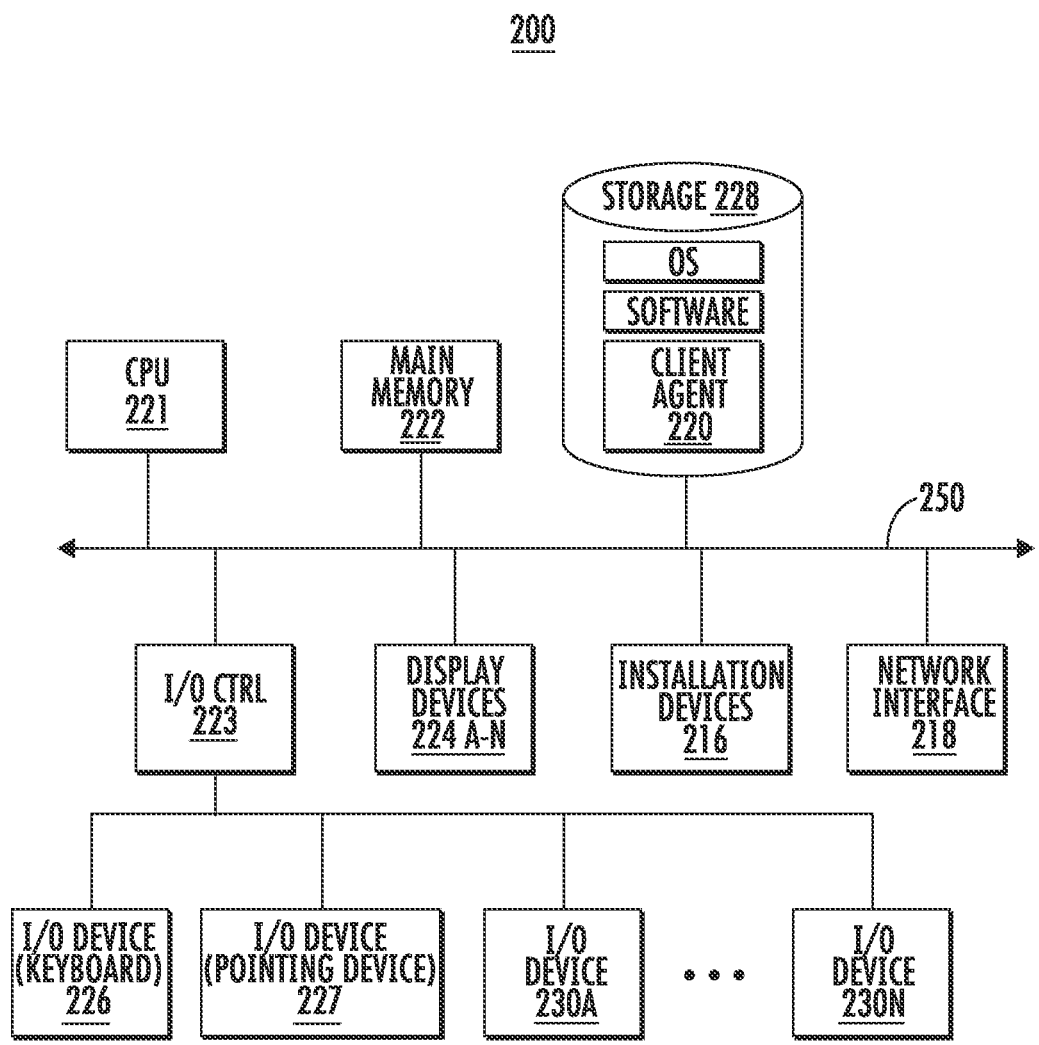
FIG. 2 is a block diagram a general computing device useful as an embodiment of the servers or the mobile computing devices illustrated in FIG. 1

Referring initially to FIGS. 1-2, a non-limiting illustrative network environment useful for practicing embodiments described herein is first described. FIG. 1 illustrates one embodiment of a computing environment 100 that includes one or more mobile computing devices 102A-102N in communications with one or more servers 106A-106N via one or more networks 104. One or more cellular base stations 108 may be associated with a network provider to relay communications to and from the mobile computing devices 102A-102N. The mobile computing devices 102A-102N may be generally referred to by reference 102, and the servers 106A-106N may be generally referred to by reference 106.

In some embodiments, the mobile computing device 102 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a mobile computing device 102 that displays application output generated by an application remotely executing on a server 106. In these embodiments, the client device 102 may display the application output in an application window, a browser, or other output window. In one embodiment, the application may be a desktop, while in other embodiments the application may be an application that generates a desktop.

In some embodiments, a server 106 may execute a remote presentation client or other client or program that uses a thin-client or remote-display protocol to capture display output generated by an application executing on a server 106 and transmits the application display output to a mobile computing device 102.

A server 106 may be any remote machine type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; an application server or as a master application server; a server executing an active directory; or a server executing an application acceleration program that provides firewall functionality, application functionality, or load balancing functionality.

In some embodiments, a server 106 may be a RADIUS server that includes a remote authentication dial-in user service. In still other embodiments, a server 106 is a blade server. In yet other embodiments, a server 106 executes a virtual machine providing, to a mobile computing device 102, access to a computing environment.

The server 106 may, in some embodiments, execute any one of the following applications: a thin-client application using a thin-client protocol to transmit application display data to a client; or a remote display presentation application. Another embodiment includes a server 106 that is an application server such as: an email server that provides email services; a web or Internet server; a desktop sharing server; a collaboration server; or any other type of application server. Still other embodiments include a server 106 that executes a hosted server application, such as a remote meeting or desktop sharing application.

In some embodiments, a server machine 106 may execute an application on behalf of a user of a mobile computing device 102. In other embodiments, a server 106 executes a virtual machine, which provides an execution session within which applications execute on behalf of a mobile computing device 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

A mobile computing device 102 may be, for example, a client node that seeks access to resources provided by a server 106. In other embodiments, the server 106 may provide mobile computing devices 102 with access to hosted resources. The server 106, in some embodiments, functions as a master node such that it communicates with one or more mobile computing device 102 or servers 106. In some embodiments, the master node may identify and provide address information associated with a server 106 hosting a requested application, to one or more mobile computing devices 102 or servers 106.

In yet another embodiment, the server 106 presents the response to the request to a mobile computing device 102 using a web interface. In one embodiment, the mobile computing device 102 communicates directly with the server 106 to access the identified application. In another embodiment, the mobile computing device 102 receives output data, such as display data, generated by an execution of the identified application on the server 106.

One or more mobile computing devices 102, one or more servers 106, or both may transmit data over one or more networks 104 installed within the computing environment 100. The network 104 may comprise one or more sub-networks, and may be installed between any combination of the mobile computing devices 102 and servers 106.

In some embodiments, the network 104 may be: a local-area network (LAN); a metropolitan area network (MAN); a wide area network (WAN); a primary network comprised of multiple sub-networks located between the mobile computing devices 102 and the servers 106; a primary public network with a private sub-network; a primary private network with a public sub-network; or a primary private network with a private sub-network.

Still further embodiments include a network 104 that may be any of the following network types: a point to point network; a broadcast network; a telecommunications network; a data communication network; a computer network; an Asynchronous Transfer Mode (ATM) network; a Synchronous Optical Network (SONET) network; a Synchronous Digital Hierarchy (SDH) network; a wireless network; a wireline network; or a network 104 that includes a wireless link where the wireless link may be an infrared channel or satellite band.

The network topology of the network 104 may differ within different embodiments. Additional embodiments may include a network 104 of mobile telephone networks that use a protocol to communicate among mobile devices, where the protocol may be any one of the following: Advanced Mobile Phone System (AMPS); Time Division Multiple Access (TDMA); Code Division Multiple Access (CDMA); Global System for Mobile Communications (GSM); General Packet Radio Service (GPRS); Universal Mobile Telecommunications System (UMTS); Evolution-Data Optimized (EV-DO); Long Term Evolution (LTE); or any other protocol able to transmit data among mobile devices like 802.11, Bluetooth, and Near Field Communication.

FIG. 2 depicts a block diagram of a general computing device 200 useful for practicing an embodiment of the mobile computing device 102 or the server 106. The illustrated computing device 200 includes a central processing unit (CPU) 221 and a main memory unit 222. The processing unit 221 communicates with the main memory 222 via a system bus 250.

The system bus 250 communicates with the following components: a processing unit 221; a main memory 122; storage memory 228; an input/output (I/O) controller 123; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

In some embodiments, the processing unit 221 may include one or more processing cores. For example, the processing unit 221 may have two cores, four cores, eight cores, etc. In one embodiment, the processing unit 221 may comprise one or more parallel processing cores. The processing cores of the processing unit 221 may in some embodiments access available memory as a global address space, or in other embodiments, memory within the computing device 200 may be segmented and assigned to a particular core within the processing unit 221.

In one embodiment, the one or more processing cores or processors in the computing device 200 may each access local memory. In still another embodiment, memory within the computing device 200 may be shared among one or more processors or processing cores, while other memory may be accessed by particular processors or subsets of processors.

In embodiments where the computing device 200 includes more than one processing unit 221, the multiple processing units 221 may be included in a single integrated circuit (IC). These multiple processors, in some embodiments, may be linked together by an internal high speed bus, which may be referred to as an element interconnect bus.

The computing device 200, in some embodiments, may include a graphics processor or a graphics-processing unit. The graphics processing unit may include any combination of software and hardware, and may further input graphics data and graphics instructions, render a graphic from the inputted data and instructions, and output the rendered graphic. In some embodiments, the graphics processing unit may be included within the processing unit 221. In other embodiments, the computing device 200 may include one or more processing units 221, where at least one processing unit 221 is dedicated to processing and rendering graphics.

The local system bus 250 may, in some embodiments, also be used by the central processing unit 221 to communicate with more than one type of I/O device 230A-230N. Other embodiments of the computing machine 200 include an I/O device 230A-230N that is a video display 224 that communicates with the CPU 221.

One embodiment of the computing device 200 provides support for any one of the following installation devices 216: a CD-ROM drive, a CD-R/RW drive, a DVD-ROM drive, tape drives of various formats, a universal serial bus (USB) device, Secure Digital card, Preboot Execution Environment (PXE) firmware, a bootable medium, a bootable CD, a hard-drive or any other device suitable for installing applications or software.

Applications may in some embodiments include a client agent 220, or any portion of a client agent 220. The computing device 200 may further include a storage device 228 that may be either one or more hard disk drives, or one or more redundant arrays of independent disks; where the storage device is configured to store an operating system, software, programs applications, or at least a portion of the client agent 220. A further embodiment of the computing device 200 includes an installation device 216 that is used as the storage device 228.

The computing device 200 may further include a network interface 218 to interface to a LAN, WAN or the Internet through a variety of connections including, but not limited to, standard telephone lines, LAN or WAN links (e.g., 802.11, T1, T3, 56 kb, X.25), broadband connections (e.g., Integrated Services Digital Network (ISDN), Frame Relay, ATM, Gigabit Ethernet, Ethernet-over-SONET), wireless connections, or some combination of any or all of the above. Connections may also be established using a variety of communication protocols (e.g., TCP/IP, Ethernet, Attached Resource Computer Network (ARCNET), SONET, SDH, Fiber Distributed Data Interface (FDDI), RS232, RS485, IEEE 802.11, IEEE 802.11a/b/g/n, CDMA, GSM, Wi-Fi, WiMax and direct asynchronous connections).

One version of the computing device 200 includes a network interface 218 able to communicate with additional computing devices via any type and/or form of gateway or tunneling protocol such as Secure Socket Layer (SSL) or Transport Layer Security (TLS). Versions of the network interface 218 may comprise any one of: a built-in network adapter; a network interface card; a Personal Computer Memory Card International Association (PCMCIA) network card; a card bus network adapter; a wireless network adapter; a USB network adapter; a modem; or any other device suitable for interfacing the computing device 200 to a network capable of communicating and performing the methods and systems described herein.

Embodiments of the computing device 200 include any one of the following I/O devices 230A-230N: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein.

An I/O controller 223 may in some embodiments connect to multiple I/O devices 203A-230N to control the one or more I/O devices. Some embodiments of the I/O devices 230A-230N may be configured to provide storage or an installation device 216, while others may provide a USB interface for receiving USB storage devices.

Still other embodiments include an I/O device 230 that may be a bridge between the system bus 250 and an external communication bus, such as: a USB bus; an RS-232 serial connection; a Small Computer System Interface (SCSI) bus; an IEEE 1394 bus; an Ethernet bus; a Gigabit Ethernet bus; an ATM bus; a High Performance Parallel Interface (HIPPI) bus; a Super HIPPI bus; a SerialPlus bus; a Scalable Coherent Interface (SCI) bus; a FibreChannel bus; or a Serial Attached SCSI (SAS) bus.

In some embodiments, the computing machine 200 may connect to multiple display devices 224A-224N, in other embodiments the computing device 200 may connect to a single display device 224, while in still other embodiments the computing device 200 connects to display devices 224A-224N that are the same type or form of display, or to display devices that are different types or forms.

Embodiments of the display devices 224A-224N may be supported and enabled by the following: one or multiple I/O devices 230A-230N; the I/O controller 223; a combination of I/O device(s) 230A-230N and the I/O controller 223; any combination of hardware and software able to support a display device 224A-224N; any type and/or form of video adapter, video card, driver, and/or library to interface, communicate, connect or otherwise use the display devices 224A-224N. The computing device 200 may in some embodiments be configured to use one or multiple display devices 224A-224N.

In some embodiments, the computing machine 200 may execute any operating system, while in other embodiments the computing machine 200 may execute any of the following operating systems: any embedded operating system; any real-time operating system; any remote operating system; any operating systems for mobile computing devices; or any other operating system.

In still another embodiment, the computing machine 200 may execute multiple operating systems. For example, the computing machine 200 may execute a virtualization platform that may execute or manage a virtual machine executing a first operating system, while the computing machine 200 executes a second operating system different from the first operating system.

The computing machine 200 may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a digital audio player or any other type and/or form of computing, telecommunications or media device that is capable of communication and that has sufficient processor power and memory capacity to perform the methods and systems described herein.

In other embodiments the computing machine 200 may be a mobile device such as any one of the following mobile devices: a cellular telephone or personal digital assistant (PDA); a smart phone; a handheld computing device; any computing device that has different processors, operating systems, and input devices consistent with the device; or any other mobile computing device capable of performing the methods and systems described herein.

In one embodiment, the computing device 200 may be a digital audio player which functions as both a portable media player and as a mass storage device. In some embodiments, the computing device 200 may have different processors, operating systems, and input devices consistent with the device.

In some embodiments, the computing device 200 comprises a combination of devices, such as a mobile phone combined with a digital audio player or portable media player. In one of these embodiments, the computing device 200 is a combination digital audio player and mobile phone. In another of these embodiments, the computing device 200 is a smartphone. In another of these embodiments, the computing device 200 is a tablet computer.

Figure 3:
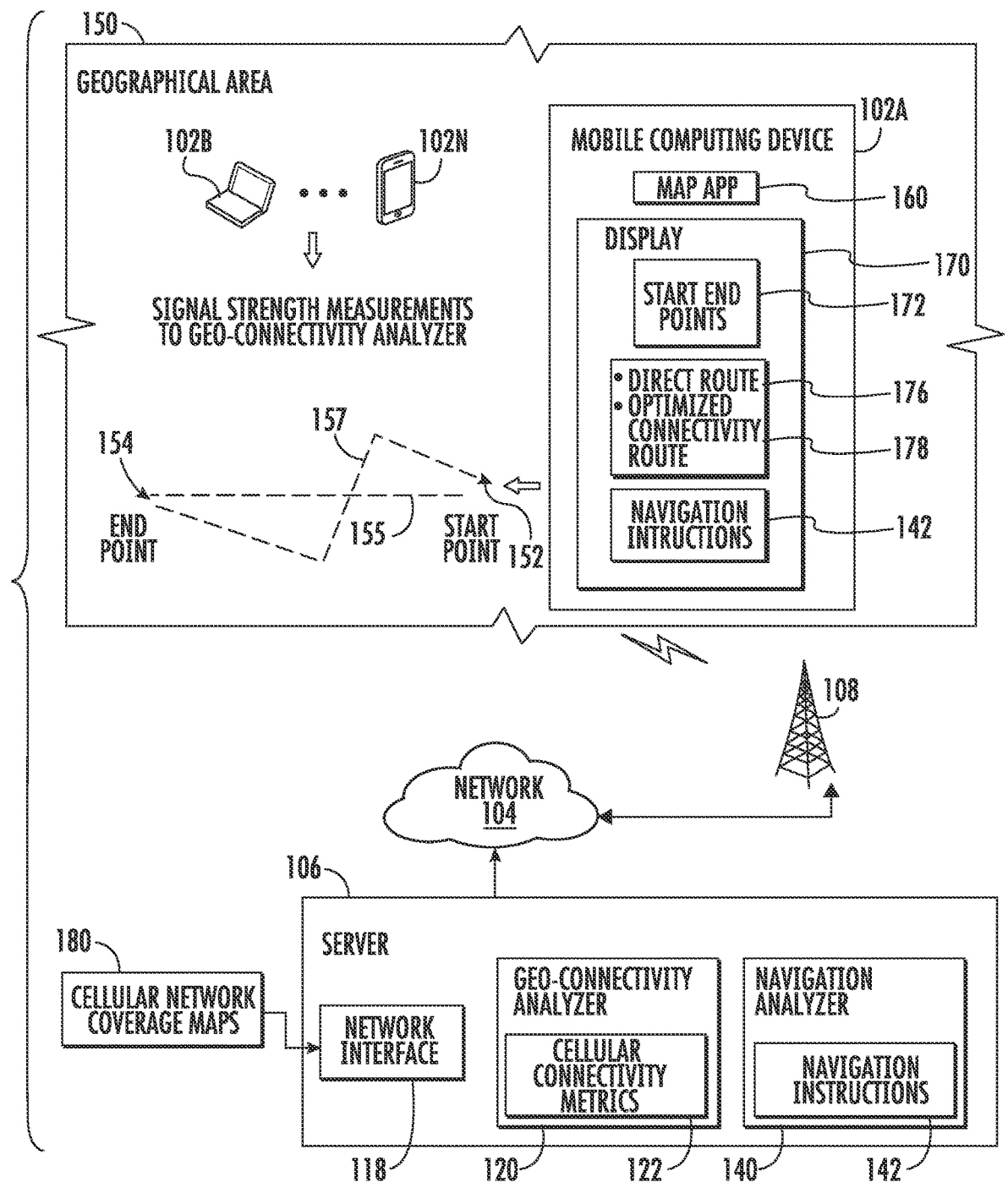
FIG. 3 is a more detailed block diagram of a server and mobile computing device operating within the network environment as illustrated in FIG. 1.

Referring now to FIG. 3, generation of network connectivity based navigation instructions 142 between any two geolocations within a geographical area 150 will be discussed. The illustrated embodiment includes mobile computing devices 102A-102N operating within the geographical area 150 and in communications with a server 106 via a cellular base station 108 and a network 104. The navigation instructions 142 are provided from the server 106 to the mobile computing devices 102A making the request.

The mobile computing devices 102A-102N may be laptop computers or smart phones, for example, executing enterprise productivity software, such as XenMobile. Mobile users who are sales professionals, for example, frequently travel and typically need to participate in online meetings and conference calls while travelling on the road. However, such meetings or conference calls may be interrupted due to cellular network connectivity issues.

As readily appreciated by those skilled in the art, signal strength levels may fluctuate among mobile computing devices 102A-102N operating within the geographical area 150. Operation of the mobile computing devices 102A-102N is based on a cellular service provider, such as Vodafone, Sprint, Verizon, T-Mobile, or AT&T, for example. Coverage as determined in signal strength levels may vary among the different cellular service providers.

To assist the mobile user with navigation instructions 142 while traveling within the geographical area 150, at least one of the mobile computing devices 102A include a map application 160, such as Google Maps, for example. When the map application 160 is executed by the mobile computing device 102A, the mobile user is prompted on display 170 via display prompt 172 to enter two geo-locations within the geographical area 150, i.e., a start point 152 and an end point 154.

The mobile user is also prompted to select the type of route desired. Display prompt 176 on the display 170 allows the mobile user to select navigation instructions for a route 155 that is the shortest distance between the two geo-locations 152, 154 regardless of cellular network connectivity metrics. Display prompt 178 on the display 170 allows the mobile user to select navigation instructions for a route 157 that is optimized for cellular network connectivity metrics.

If the mobile user is to participate in an online meeting or conference call while traveling, the mobile user will select display prompt 178 for the route 157 that is optimized for cellular network connectivity metrics. Cellular network connectivity metrics include signal strength levels, for example. The higher the signal strength level the less likely the online meeting or conference call will be interrupted.

The server 106 includes a network interface 118 that is configured to interface with the mobile computing devices 102A-102N operating within the geographical area 150, with at least one of the mobile computing devices, e.g., 102A, providing the request for navigation instructions within the geographical area 150.

The server 106 further includes a geo-connectivity analyzer 120 and a navigation analyzer 140. The geo-connectivity analyzer 120 is configured to receive cellular network connectivity metrics 122 for the geographical area 150. The cellular network connectivity metric values typically vary within the geographical area 150.

Figure 4:
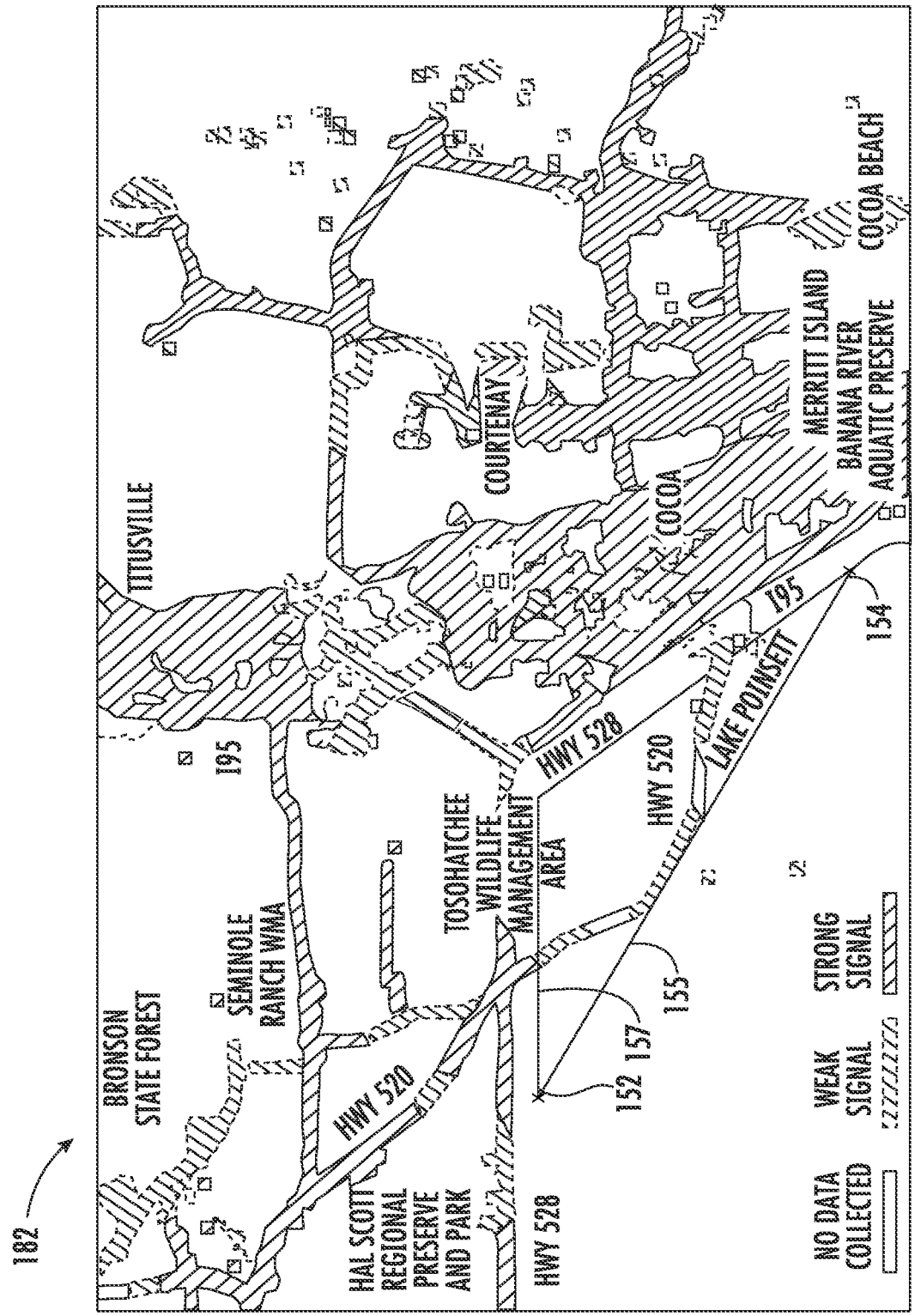
FIG. 4 is a display of a network connectivity map generated by the geo-connectivity analyzer illustrated in FIG. 3.

The geo-connectivity analyzer 120 generates a network connectivity map 182, as illustrated in FIG. 4, based on the varying cellular network connectivity metrics. The network connectivity map 182 includes areas with strong cellular network connectivity metric values and areas with weak cellular network connectivity metric values. The illustrated network connectivity map 182 is in the form of a heat map and uses dark shading to represent strong cellular network connectivity metric values, light shading to represent weak cellular network connectivity metric values, and no shading to represent no data collected.

The navigation analyzer 140 is coupled to the geo-connectivity analyzer 120 and is configured to generate the navigation instructions 142 between the two geo-locations 152, 154 based on the network connectivity map 182. When display prompt 178 is selected by the mobile user, the navigation instructions 142 provide a route that is optimized to include the areas with the strong cellular network connectivity metric values.

Still referring to the network connectivity map 182, a mobile user has a start point 152 along Highway 528 and an end point 154 along Interstate 95. The most direct or shortest route 155 is for the mobile user to exit from Highway 528 onto Highway 520 which then connects with Interstate 95. However, areas along Highway 520, i.e., route 155, have weak cellular network connectivity metric values. Consequently, the navigation instructions 142 instruct the mobile user to use the optimized network connectivity route 157. Here, the mobile user does not exit onto Highway 520 and instead remains on Highway 528 until Interstate 95 is reached, then the mobile user continues south on Interstate 95 to the end point 154.

The cellular network connectivity metrics 122 may be provided from multiple sources. One of the sources is from the cellular network providers in the form of cellular network connectivity maps 180. Vodafone, Sprint, Verizon, T-Mobile, and AT&T are cellular network providers that may provide their respective cellular network connectivity maps 180 for the geographical area 150. Coverage as determined in signal strength levels may vary among the different cellular network providers.

The cellular network connectivity maps 180 may also be referred to as heat maps. As discussed above, a heat map is a representation of data in the form of a map or diagram in which data values are represented as colors. The cellular network connectivity maps 180 may be similar to the network connectivity maps 182 generated by the geo-connectivity analyzer 120. The data being represented in the cellular network connectivity maps 180 is signal strength values, which may be point in time values. These values may also be updated in real time.

Another source providing cellular network connectivity metrics 122 are the other mobile computing devices 102B-102N operating within the geographical area 150 other than the mobile computing device 102A requesting the navigation instructions 142. Each of the mobile computing devices 102B-102N may automatically provide cellular connectivity metrics 122 to the geo-connectivity analyzer 120, as readily appreciated by those skilled in the art. In other embodiments, the mobile computing device 102A requesting the navigation instructions 142 may also provide cellular network connectivity metrics 122 to the geo-connectivity analyzer 120.

The cellular connectivity metrics 122 include signal strength measurements provided by each respective mobile computing devices 102B-102N operating within the geographical area 150. The geo-location of each mobile computing device 102B-102N providing the signal strength measurement, along with the cellular network provider for each mobile computing device 102B-102N are also provided to the geo-connectivity analyzer 120.

In other words, the information provided by the mobile computing devices 102B-102N operating within the geographical area 150 includes geo-location, cellular network signal strength values, vendor and other business application performance metrics. For illustration purposes, a sample of collected information from the mobile computing devices 102B-102N may be as follows:

```
{
"location": {
"lat": 51.0,
"lng": −0.1
},
"accuracy": 1200.4
}
{
"homeMobileCountryCode": 310,
"homeMobileNetworkCode": 410,
"radioType": "gsm",
"carrier": "Vodafone",
"signalStrength": −60 dBm,
"considerIp": "true",
}
```

The information provided by the mobile computing devices 102B-102N is correlated with the cellular network connectivity maps 180 to enable selection of navigation routes optimized for the best cellular network connectivity at a given point of time. This correlation by the geo-connectivity analyzer 120 is used to generate the network connectivity maps 182 which allows a navigation route with the best network coverage/connectivity to be selected so as to enable better user experience, productivity and business continuity. Another advantageous feature of the server is to alert a mobile user about connectivity issues and potential application performance degradation while on the move.

Figure 5:
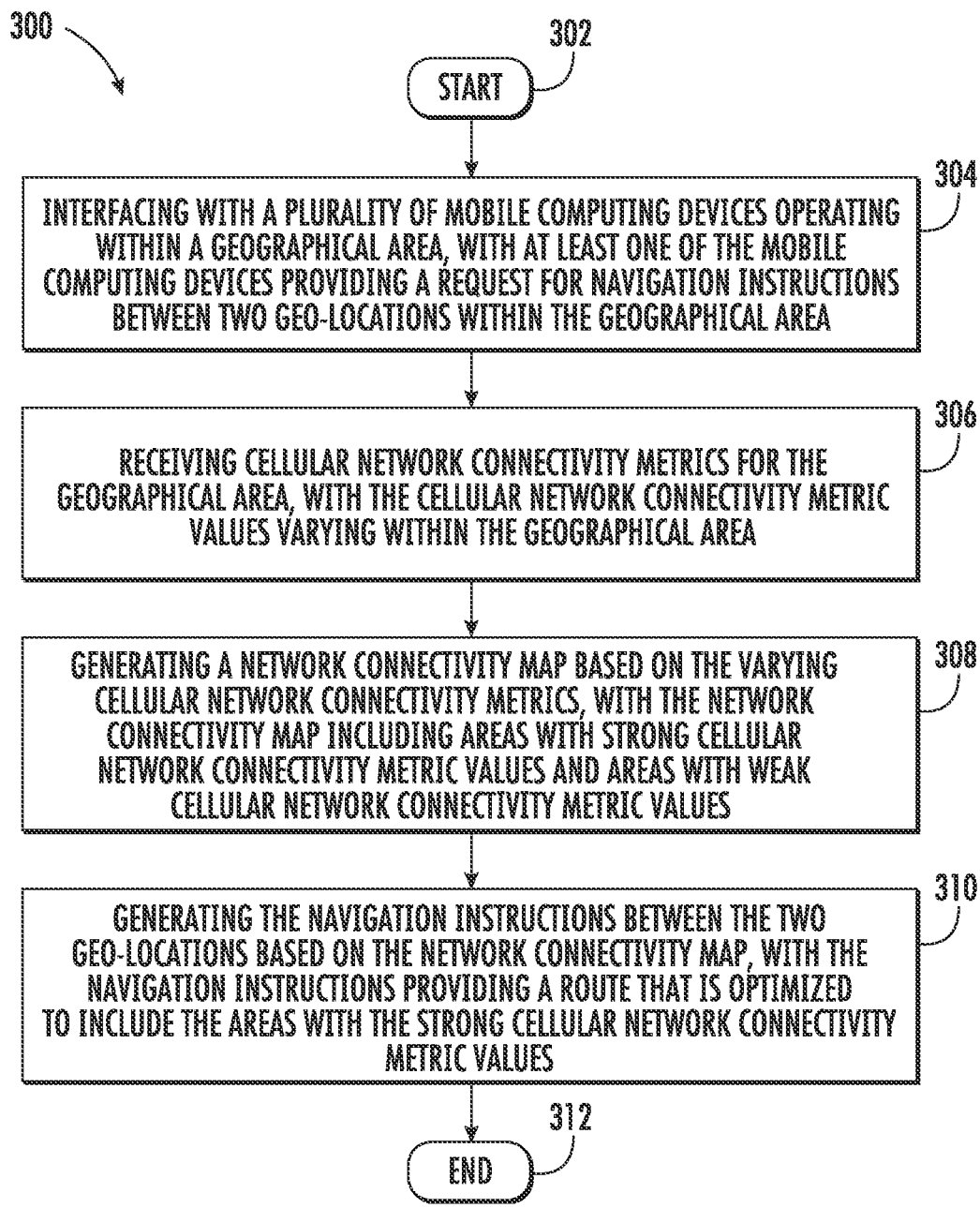
FIG. 5 is a flow diagram illustrating the steps for generating network connectivity based navigation instructions for the mobile computing device illustrated in FIG. 3.

Referring now to the flow diagram 300 in FIG. 5, a method for generating network connectivity based navigation instructions 142 for a mobile computing device 102 will be discussed. From the Start (Block 302), the method comprises interfacing with a plurality of mobile computing devices 102A-102N operating within a geographical area 150 at Block 304, with at least one of the mobile computing devices 102A providing a request for navigation instructions between two geo-locations 152, 154 within the geographical area 150.

Cellular network connectivity metrics 122 are received at Block 306 for the geographical area 150. The cellular network connectivity metric values 122 vary within the geographical area 150. A network connectivity map 182 is generated at Block 308 based on the varying cellular network connectivity metrics 122. The network connectivity map 182 includes areas with strong cellular network connectivity metric values and areas with weak cellular network connectivity metric values. Better connectivity is provided to the mobile computing device 102A when operating in the areas with the strong cellular network connectivity metric values. The navigation instructions 172 between the two geo-locations 152, 154 are generated at Block 310 based on the network connectivity map 182. The navigation instructions 142 provides a route that is optimized to include the areas with the strong cellular network connectivity metric values. The method ends at Block 312.

Yet another aspect is directed to a non-transitory computer readable memory for a server 106 as described above, with the non-transitory computer readable medium having a plurality of computer executable instructions for causing the server 106 to perform the steps of interfacing with a plurality of mobile computing devices 102A-102N operating within a geographical area 150, with at least one of the mobile computing devices 102A providing a request for navigation instructions between two geo-locations 152, 154 within the geographical area 150. The steps further include receiving cellular network connectivity metrics 122 for the geographical area 150. The cellular network connectivity metric values 122 vary within the geographical area 150. A network connectivity map 182 is generated based on the varying cellular network connectivity metrics 122. The network connectivity map 182 includes areas with strong cellular network connectivity metric values and areas with weak cellular network connectivity metric values. The navigation instructions 142 between the two geo-locations 152, 154 are generated based on the network connectivity map 182. The navigation instructions 142 provides a route that is optimized to include the areas with the strong cellular network connectivity metric values.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A server comprising:
   a network interface configured to interface with a plurality of mobile computing devices operating within a geographical area, with at least one of the mobile computing devices providing a request for navigation instructions between two geo-locations based on prompting the user to select an optimized connectivity route prompt; and
   a processor coupled to said network interface and configured to perform the following:
      generate a network connectivity map based on varying cellular network connectivity metrics for the geographical area, and
      generate, based on the user-selected optimized connectivity route prompt, the navigation instructions between the two geo-locations to be provided to the at least one mobile communications device via said network interface, with the navigation instructions being generated based on the network connectivity map to provide a single route that is optimized to include areas with strong cellular network connectivity metric values.

2. The sever according to claim 1 wherein the route provided by said processor is not the most direct route between the two geo-locations within the geographical area.

3. The server according to claim 1 wherein the cellular network connectivity metrics are based on at least one cellular network connectivity map from at least one cellular network service provider operating within the geographical area.

4. The sever according to claim 1 wherein the cellular network connectivity metrics are based on signal strength measurements provided by the plurality of mobile computing devices operating within the geographical area.

5. The sever according to claim 4 wherein the signal strength measurements provided by each respective mobile computing device further include geo-coordinates on where the signal strength measurements were made.

6. The sever according to claim 4 wherein the signal strength measurements provided by each respective mobile computing device includes identification of a cellular network service provider operating with the respective mobile computing device.

7. A method comprising:
   interfacing with a plurality of mobile computing devices operating within a geographical area, with at least one of the mobile computing devices providing a request for navigation instructions between two geo-locations based on prompting the user to select an optimized connectivity route prompt;
   generating a network connectivity map based on varying cellular network connectivity metrics for the geographical area; and
   generating, based on the user-selected optimized connectivity route prompt, the navigation instructions between the two geo-locations to be provided to the at least one mobile communications device via said network interface, with the navigation instructions being generated based on the network connectivity map to provide a single route that is optimized to include areas with strong cellular network connectivity metric values.

8. The method according to claim 7 wherein the route is not the most direct route between the two geo-locations within the geographical area.

9. The method according to claim 7 wherein the cellular network connectivity metrics are based on at least one cellular network connectivity map from at least one cellular network service provider operating within the geographical area.

10. The method according to claim 7 wherein the cellular network connectivity metrics are based on signal strength measurements provided by the plurality of mobile computing devices operating within the geographical area.

11. The method according to claim 10 wherein the signal strength measurements provided by each respective mobile computing device further include geo-coordinates on where the signal strength measurements were made.

12. The method according to claim 10 wherein the signal strength measurements provided by each respective mobile computing device includes identification of a cellular network service provider operating with the respective mobile computing device.

13. The method according to claim 7 further comprising providing the navigation instructions to the mobile computing device providing the request.

14. A non-transitory computer readable medium for a server, with the non-transitory computer readable medium having a plurality of computer executable instructions for causing the server to perform steps comprising:
   interfacing with a plurality of mobile computing devices operating within a geographical area, with at least one of the mobile computing devices providing a request for navigation instructions between two geo-locations based on prompting the user to select an optimized connectivity route prompt;
   generating a network connectivity map based on varying cellular network connectivity metrics for the geographical area; and
   generating, based on the user-selected optimized connectivity route prompt, the navigation instructions between the two geo-locations to be provided to the at least one mobile communications device via said network interface, with the navigation instructions being generated based on the network connectivity map to provide a single route that is optimized to include areas with strong cellular network connectivity metric values.

15. The non-transitory computer readable medium according to claim 14 wherein the route is not the most direct route between the two geo-locations within the geographical area.

16. The non-transitory computer readable medium according to claim 14 wherein the cellular network connectivity metrics are based on at least one cellular network connectivity map from at least one cellular network service provider operating within the geographical area.

17. The non-transitory computer readable medium according to claim 14 wherein the cellular network connectivity metrics are based on signal strength measurements provided by the plurality of mobile computing devices operating within the geographical area.

18. The non-transitory computer readable medium according to claim 17 wherein the signal strength measurements provided by each respective mobile computing device further include geo-coordinates on where the signal strength measurements were made.

19. The non-transitory computer readable medium according to claim 17 wherein the signal strength measurements provided by each respective mobile computing device includes identification of a cellular network service provider operating with the respective mobile computing device.

* * * * *